US008793230B2

(12) United States Patent
Engelko et al.

(10) Patent No.: US 8,793,230 B2
(45) Date of Patent: Jul. 29, 2014

(54) SINGLE-DATABASE MULTIPLE-TENANT SOFTWARE SYSTEM UPGRADE

(71) Applicants: Andrey Engelko, Karlsruhe (DE); Volker Driesen, Walldorf (DE)

(72) Inventors: Andrey Engelko, Karlsruhe (DE); Volker Driesen, Walldorf (DE)

(73) Assignee: SAP AG, Walldorf (DE)

( * ) Notice: Subject to any disclaimer, the term of this patent is extended or adjusted under 35 U.S.C. 154(b) by 156 days.

(21) Appl. No.: 13/658,644

(22) Filed: Oct. 23, 2012

(65) Prior Publication Data
US 2014/0114913 A1 Apr. 24, 2014

(51) Int. Cl.
G06F 17/30 (2006.01)
(52) U.S. Cl.
USPC .......................................... 707/695
(58) Field of Classification Search
USPC ................. 707/638, 695, 803, 809
See application file for complete search history.

(56) References Cited

U.S. PATENT DOCUMENTS

| 5,717,924 | A * | 2/1998 | Kawai ................................ 1/1 |
| 7,080,371 | B1 * | 7/2006 | Arnaiz et al. ................. 717/170 |
| 8,296,267 | B2 * | 10/2012 | Cahill et al. .................. 707/661 |
| 2004/0019586 | A1 * | 1/2004 | Harter .............................. 707/1 |
| 2006/0020619 | A1 * | 1/2006 | Netz et al. ..................... 707/102 |
| 2006/0195436 | A1 * | 8/2006 | Levesque et al. ................. 707/4 |
| 2007/0074204 | A1 * | 3/2007 | Curtis et al. ................... 717/174 |
| 2007/0220065 | A1 * | 9/2007 | Coyle et al. ................... 707/203 |
| 2007/0299858 | A1 * | 12/2007 | Norcott .......................... 707/102 |
| 2009/0228527 | A1 * | 9/2009 | Wang ............................ 707/203 |
| 2011/0093469 | A1 * | 4/2011 | B'Far et al. ................... 707/741 |
| 2011/0213759 | A1 * | 9/2011 | Zazrivec et al. .............. 707/695 |
| 2012/0029930 | A1 * | 2/2012 | Calle et al. ........................ 705/2 |

OTHER PUBLICATIONS

"Metadata", [Online], Retrieved from the Internet: >URL: http://databasemanagement.wikia.com/wiki/Metadata>, (Accessed Sep. 7, 2012), 3 pgs.

* cited by examiner

Primary Examiner — Cam-Linh Nguyen
(74) Attorney, Agent, or Firm — Schwegman, Lundberg & Woessner, P.A.

(57) ABSTRACT

Example systems and methods of upgrading a single-database, multiple-tenant software system are presented. In one example, a target database schema for a target version of the software system is created. For each tenant of a current database schema for a current version of the software system, a current state of the data corresponding to the tenant in the current database schema is captured. The data corresponding to the tenant is transitioned from the current database schema to the target database schema. The tenant in the target database schema is tested to verify the tenant. If the tenant in the target database schema is verified, the tenant in the target database schema is opened for users. If not verified, the tenant in the current database schema is restored using the captured state.

20 Claims, 10 Drawing Sheets

SINGLE-DATABASE MULTIPLE-TENANT SOFTWARE SYSTEM UPGRADE

BACKGROUND

Large computing systems, such as, for example, enterprise resource planning (ERP) systems, may host applications or software systems, as well as one or more associated databases, to be accessed by one or more users or customers. Further, each database may include data for one or more "tenants," each of which may be associated with a particular client or customer of the system. Generally, each tenant can access its specific data, but not the data of other tenants. The software systems may facilitate one or more business functions, such as sales, marketing, product development, finance, human resources, and the like. Periodically, the software systems, as well as the databases associated therewith, may be upgraded to provide additional functionality, to address previously discovered performance issues, or to satisfy other purposes.

During a software system upgrade, an associated database may need to be upgraded as well due to changes in the types of data being stored, the format or structure of the data, and for other reasons. In one type of upgrade procedure, a single downtime window is employed for all tenants of the database. During the downtime, all database tenants are prevented from executing the current software version to ensure that the data of the database is not being altered during the upgrade. The tenant data of the current database version associated with the current version of the system is then upgraded to a target version of the database associated with the upgraded version of the software. The target version of the software may then be initiated for use by the customers. This type of upgrade procedure is employed typically in large systems with one, or only a few, tenants, to avoid affecting a large number of clients or customers for a long time period. Also, as all database tenant are upgraded at the same time, and individual "fallback" position for each tenant in case of a failure in the upgrade procedure is not normally provided. Thus, a problem with the upgrading of one the tenants may cause a retry of the upgrade procedure for all tenants.

In an alternative upgrade procedure, an entirely separate software system and associated database for the upgraded software may be provided. As a result, each database tenant may be transported from the current database to the target database separately, as both the current and target software systems may be operating simultaneously. Accordingly, an unsuccessful upgrade of any tenant may be reversed, thus allowing the tenant to continue to operate with the older, current software system and database. To implement this alternative upgrade procedure, two separate software systems and databases are maintained for at least some period of time. As a result, all customer or tenant data in the database are moved from one separate software system and database to another, regardless of whether the data is actually reformatted or reconstructed as part of the upgrade.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, method, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instructions instances, protocols, structures, and techniques have not been shown in detail.

Figure 1:
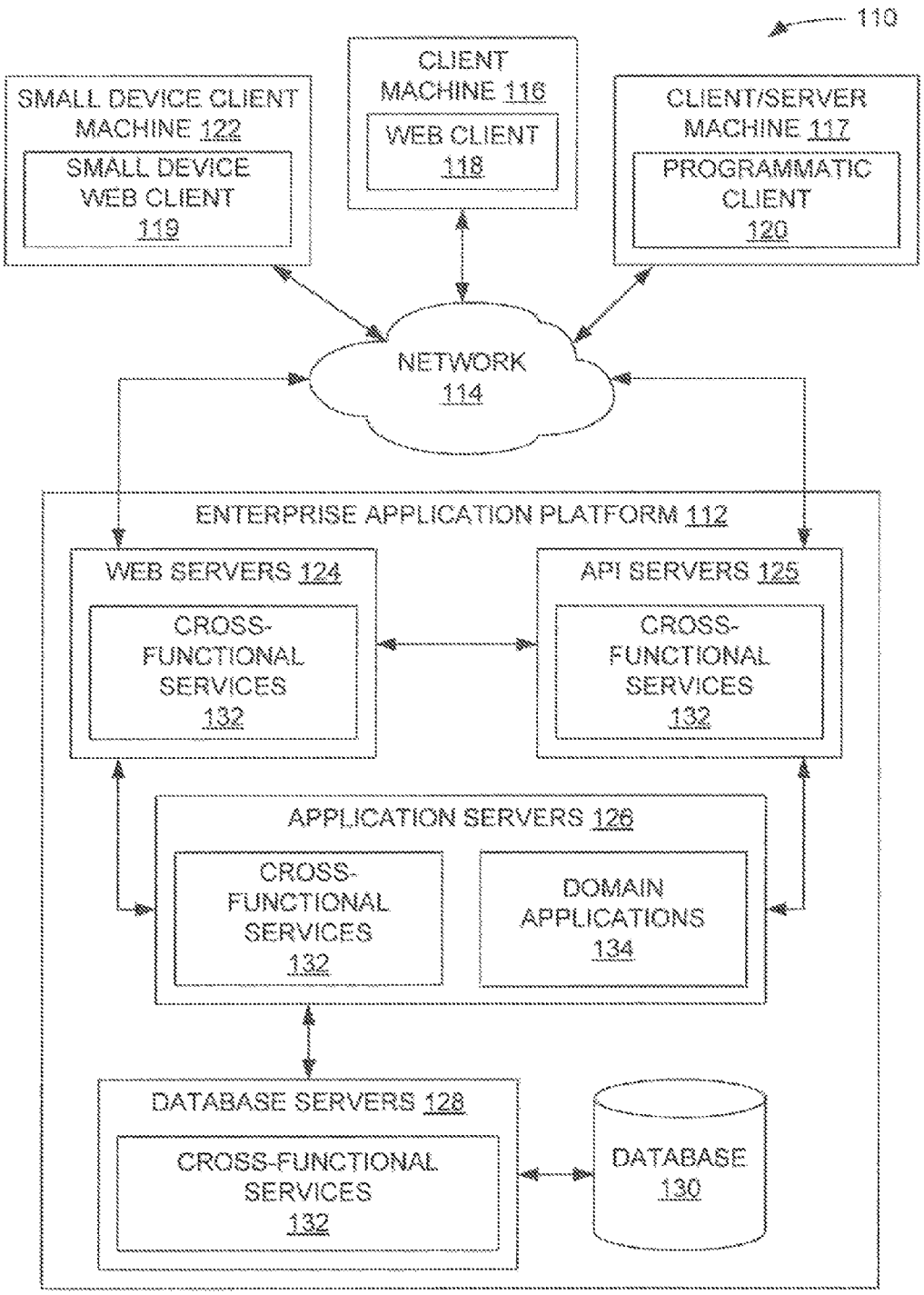
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to on or more clients. FIG. 1 illustrates, for example, a client machine 116 with a web client 118 (e.g., a browser, such as the Internet Explorer® browser developed by Microsoft® Corporation), a small device client machine 122 with a small device web client 119 (e.g., a browser without a script engine), and a client/server machine 117 with a programmable client 120.

Turning specifically to the enterprise application platform 112, web servers 124 and application program interface (API) servers 125 are coupled to, and provide web and programmatic interfaces to, application servers 126. The application servers 126 are, in turn, shown to be coupled to one or more database servers 128 that may facilitate access to one or more databases 130. The web servers 124, application program interface servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client machine 116, the client/server machine 117, and the small device client machine 122. In addition, the cross-functional services 132 may provide an environment for delivering enhancements to existing applications and for integrating third-party and legacy applications with existing cross-functional services 132 and domain applications 134. Further, while the system 110 shown in FIG. 1 employs a client-server architecture, and could equally well find application in a distributed or peer-to-peer architecture system.

Figure 2:
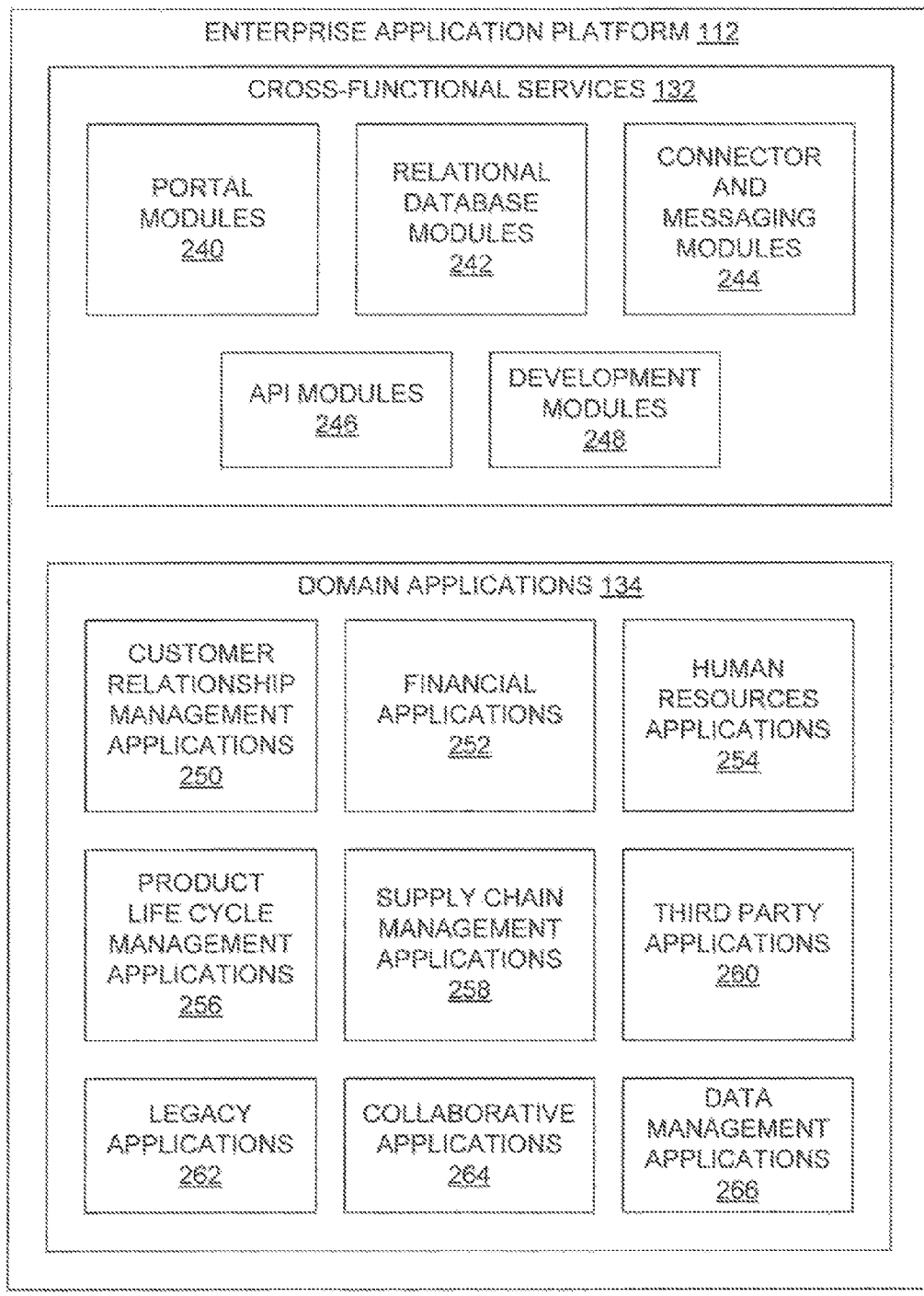
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, application program interface (API) modules 246, and development modules 248.

The portal modules 240 may enable a single point of access to other cross-functional services 132 and domain applications 134 for the client machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user my perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java®, J2EE, SAP's Advanced Business Application Programming (ABAP®) Language and Web Dynpro, XML, JCA, JAAS, X509, LDAP, WSDL, WSRR, SOAP, UDDI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The application program interface (API) modules 246 may enable the development of service-based applications by exposing an interface to existing and new applications as services. Repositories may be included in the platform 112 as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, customer relationship management applications 250 may enable access to, and facilitate collecting and storing of, relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

Human resources applications 254 may be utilized by enterprise personnel and business processes to manage, deploy, and track enterprise personnel. Specifically, the human resources applications 254 may enable the analysis of human resource issues and facilitate human resource decisions based on real-time information.

Product life cycle management applications 256 may enable the management of a product throughout the life cycle of the product. For example, the product life cycle management applications 256 may enable collaborative engineering, custom product development, project management, asset management, and quality management among business partners.

Supply chain management applications 258 may enable monitoring of performances that are observed in supply chains. The supply chain management applications 258 may facilitate adherence to production plans and on-time delivery of products and services.

Third-party applications 260, as well as legacy applications 262, may be integrated with domain applications 134 and utilize cross-functional services 132 on the enterprise application platform 112.

Additionally, collaborative applications 264 may facilitate joint creation and modification of documents and other work product by multiple users, and data management applications 266 may enable data organization and other management functions to be performed on data generated by one or more other domain applications 134.

Figure 3:
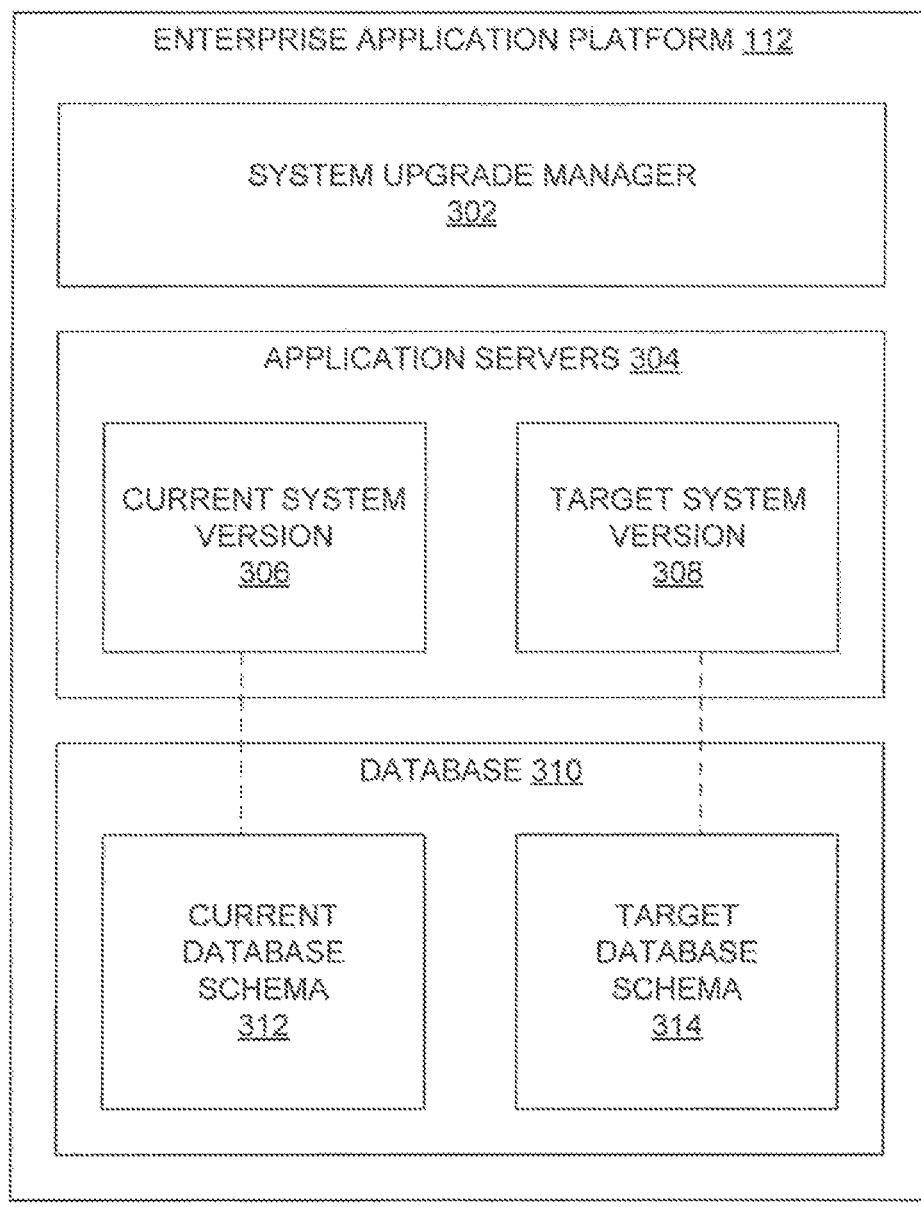
FIG. 3 is a block diagram of an example of the enterprise application platform of FIG. 1 for upgrading a single-database, multiple-tenant software system.

FIG. 3 is a block diagram of an example of the enterprise application platform 112 of FIG. 1 for upgrading a single-database, multiple tenant software system. In the example of FIG. 2, the enterprise application platform 112 may include a system upgrade manager 302, one or more application servers 304 capable of executing a current system version 306 and a target system version 308 of one or more applications, and a database 310 that includes a current database schema 312 for the current system version 306 and a target database schema 314 corresponding to the target system version 308.

One or more of the modules 302-314 of FIG. 3 may be represented in the modules of the enterprise application platform 112 depicted in FIG. 2. For example, the application servers 304 may be one or more of the application servers 126 of FIG. 2, while the current system version 306 and the target system version 308 may be two different versions of the same domain application 134 of FIG. 2. Accordingly, the database 310 may be database 130 (FIG. 1), which is accessible by one or more of the database servers 128 (also FIG. 1). In other examples, one or more of the modules 302-314 of FIG. 3 may be located external to the enterprise application platform 112.

The system upgrade manager 302 may include one or more computing systems or modules capable of performing one or more of the various operations described herein for upgrading an application executing on the application server 304 from the current system version 306 to the newer target system version 308. As is described in greater detail below, each customer or client using the current system version 306 may be upgraded or transitioned independently to the new or target system version 308. The application may be any application, including, but not limited to, the applications of an ERP system, as described above.

As depicted in FIG. 3, the application being executed may access data in the database 310. For example, a sales application may access data structures representing sales orders, invoices, parts lists, and the like that are stored in the database 310. In at least some example, the upgrading of the application or software system also involves upgrading or modifying the database schema associated with that application. As used herein, a database schema is a collection of database data structures (e.g., tables, indexes, views, sequences, synonyms, and the like) associated with a particular versions of the application or software system. As a result of an upgrade affecting the data in the database 310, the current system version 306 may access a current database schema 312 within the database 310, while the target system version 308 may employ a separate target database schema 314 within the same database 310. In at least some embodiments, a single database is employed to allow the software system upgrade to be performed without requiring additional resources for a separate database system.

Figure 4:
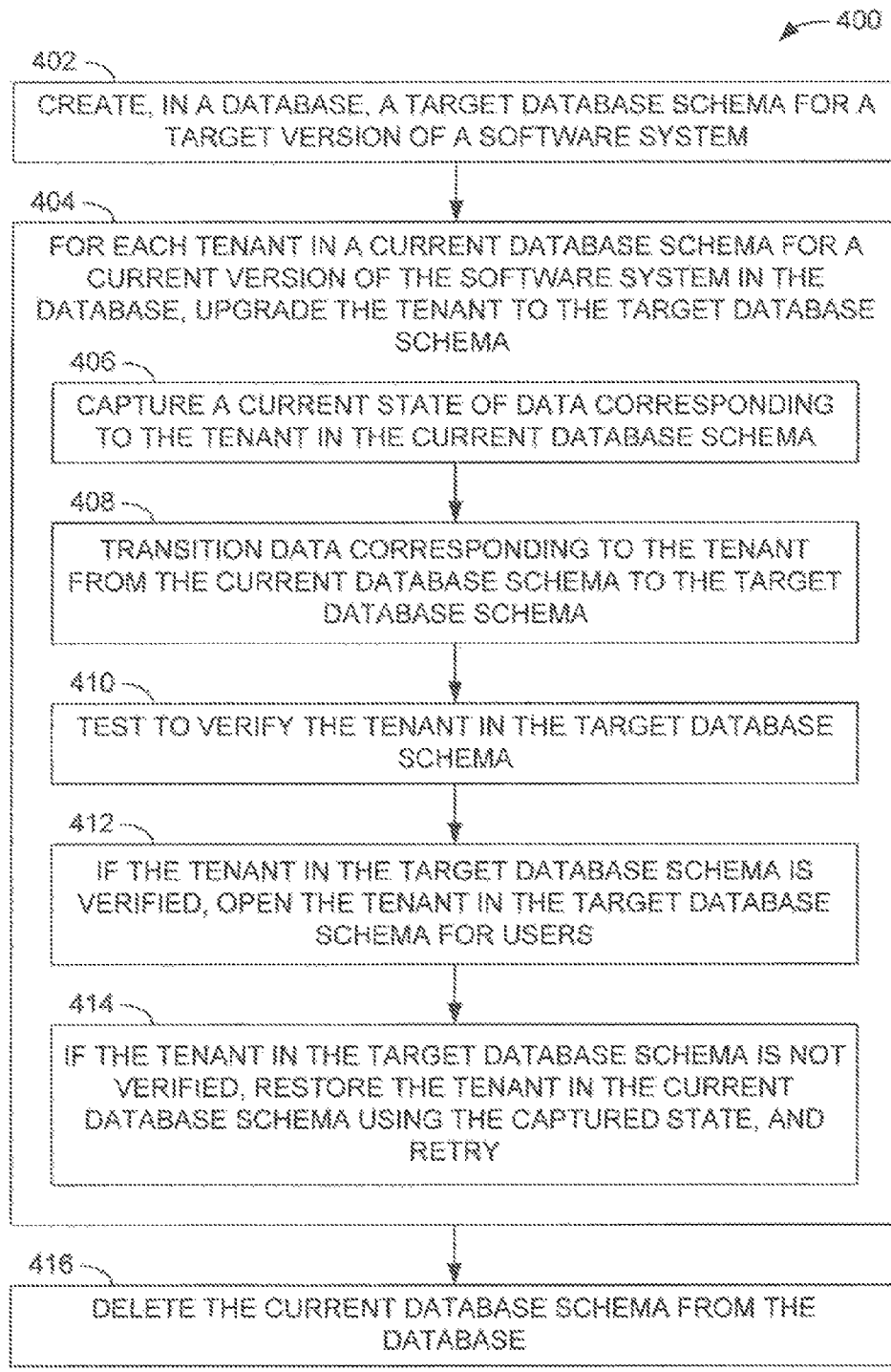
FIG. 4 is a flow diagram illustrating an example method of upgrading a single-database, multiple-tenant software system.

FIG. 4 is a flow diagram illustrating an example method 400 of upgrading a single-database, multiple-tenant software system, such as the system depicted in FIG. 3. In the method 400, the target database schema 314 for the target system version 308 is created in the database 310 (operation 402). After the target database schema 314 is created, each of the tenants of the current database schema 314 is upgraded (operation 404). After all of the tenants have been upgraded, the current database schema 312 may be deleted from the database 310 (operation 416).

In one example, the upgrading of each tenant of the current database schema 312 (operation 404) may be further accomplished according to operation 406-414 of FIG. 4. More specifically, a current state of the data for the tenant of the current database schema 312 may be captured (operation 406). The data corresponding to the tenant in the current database schema 312 may then be transitioned to the target database schema 314 (operation 408), possibly including data conversion, reformatting, or other modifications to render the data compatible with the target database schema 314 tor the client. In some examples, data that need not be modified for the upgrade may not require duplication or copying within the database 310. After the transitioning, the tenant in the target database schema 314 may be tested tor verification of correct operation (operation 410). If correct operation of the tenant in the target database schema 314 is verified, the tenant in the target database schema 314 may be opened for users (operation 412). If, instead, correct operation of the tenant in the target database schema 314 is not verified as a result of the testing, the tenant may be restored in the current database schema 312 using the captured slate (operation 414). The process of capturing another current state of the data of the tenant in the current database schema 312, the transitioning of the data of the tenant to the target database schema 314, and the testing of the operation of the tenant in the target database schema 314 may be performed one or more additional times until correct operation of the tenant in the target database schema 314 is verified.

While the operations 402 through 416 of the method 400 of FIG. 4 are shown in a specific order, other orders of operation, including possibly concurrent or continual execution of at least portions of one or more operations, may be possible in some implementations of the method 400, as well as other methods discussed herein. For example, each the tenants of the current database schema 312 may be in a different state of upgrading toward the target database schema 314 (e.g., operations 406-414), ranging from not having started the upgrade process to having completed the upgrade.

In accordance with at least some of the embodiments described above, multiple tenants may be upgraded individually from one version of an application or software system to another. As a result, each tenant may be upgraded at a time that is most convenient to the customer associated with the tenant. Further, each customer may determine whether the resulting upgrade is acceptable or to retry the upgrade process without impacting other database tenants. Additionally, by performing the upgrade within a single database, data areas of the database unaffected by the software system upgrade need not be unnecessarily moved or copied. Other possible aspects and advantages may be ascertained from the discussion of the various embodiments presented below.

Figure 5:
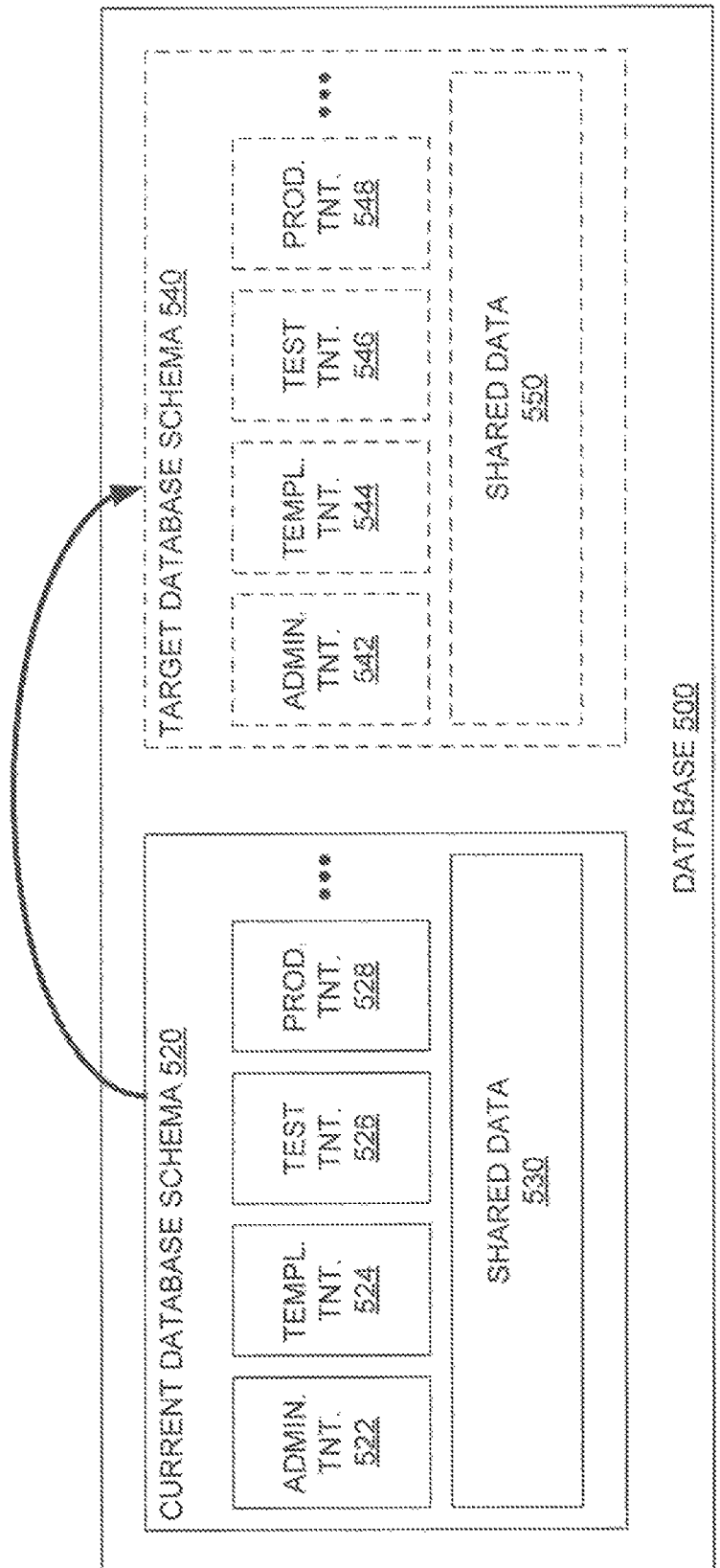
FIG. 5 is a block diagram of an example database including a database schema for a current software systems and a database schema for a target software system.

FIG. 5 is a block diagram of an example database 500 including a current database schema 520 for a current software system that is to be upgraded to a target database schema 540 for a target software system. The current database schema 520 includes data associated with several tenants 522, 524, 526, 528, as well as shared data 530 to be shared among two or more of the tenants 522-528. In the specific example of FIG. 5, the tenants 522-528 include an administration tenant 522, a template tenant 524, a test tenant 526, and one or more production tenants 528. In other examples, greater or fewer numbers or types of tenants may be included in the current database schema 520 and the target database schema 540. In some implementations, the data in the database 500 for each of the tenants 522-523 is stored as a separate database schema, while in other embodiments, the data for all tenants 522-528 may reside within a single schema, with the database 500 providing tenant-specific operations for each tenant. Examples of the tenant-specific operations may include, for example, "snapshot," "restore-to-snapshot," and Data Definition Language (DDL)-based operations, such as "create table," "create index," "alter table," and so on. In either case, data associated with each tenant is logically separated from data associated with other tenants within the database 500.

In the example current database schema 520 of FIG. 5, the administration tenant 522 may control or administer access by the current system version to the current database schema 520, including ad tenant data included therein. In one example, the administration tenant 522 may include one or more system logs, change logs, user data, and so on. The template tenant 524 may provide means by which database tables and other structures, including those belonging to other tenants of the current database schema 520, may be created. The test tenant 520 may facilitate testing of other tenants, such as the production tenants 528, to determine, if the tested tenants are operating properly. Finally, the one or more production tenants 528 may represent tenants directly accessed by customers or users of the software system version that interacts with the current database schema 520. In the case of an ERP system, each of the tenants may be associated with a particular user or class of users within an enterprise or organization, users of different organizations, or via some other user categorization.

As described above, the use of a target system version that represents a modification or upgrade from a current system version associated with the current database schema 520 may result in the creation of the target database schema 540 that includes its own administration tenant 542, template tenant 544, test tenant 546, one or more production tenants 548, and shared data 550 corresponding to their respective tenants 522-528 and shared data 530 of the current database schema 520. In one sense, each of the tenants 542-548 of the target database schema 540 represents an upgraded version of its corresponding tenant 522-528 that is compatible with the upgraded version of the software system.

In one example, as illustrated in FIG. 5, the target database schema 540 is shown as a completely separate data area from the current database schema 520, implying that all data of the various tenants 522-528 of the current database schema 520 may be copied over to a new area of the database associated with the target database schema 540. However, in other implementations, such copying may not be necessary for at least some of the data in the current database schema 520, such as data that requires no restructuring or reformatting to remain compatible with the target software system version associated with the target database schema 540. In this implementation, transitioning from the current database schema 520 to the target database schema 540 may be faster and more accurate since less overall copying is needed compared to transitioning data between database schemas located in different databases 500.

Figure 6:
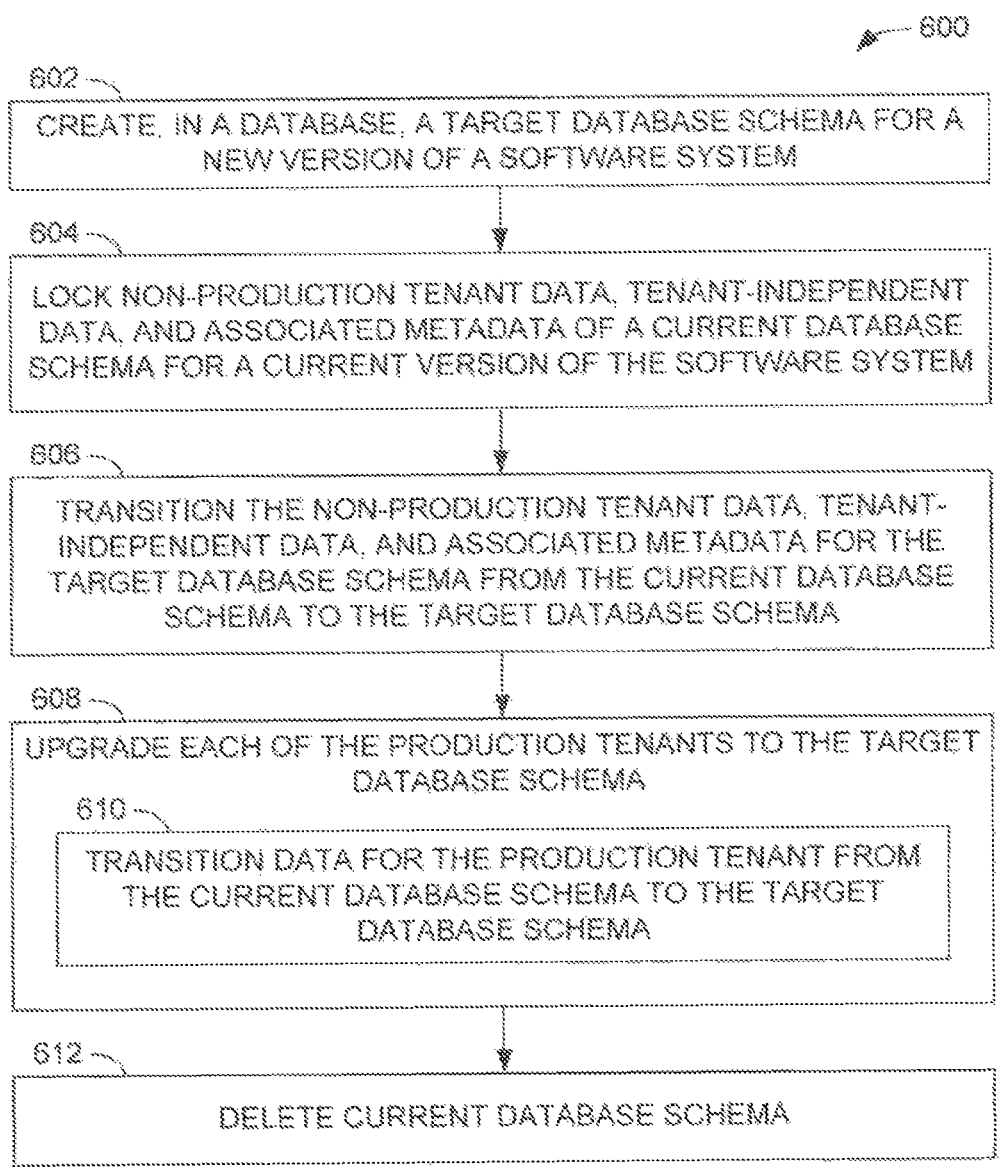
FIG. 6 is a flow diagram of another example method of upgrading a single-database, multiple-tenant software system.

FIG. 6 is a flow diagram of another example method 600 of upgrading a single-database, multiple-tenant software system using the database 500 of FIG. 5 as an example. In one example, one or more prerequisite conditions may be imposed prior to executing the operations of the method 600. For example, the application or software system to be upgraded, as well as the underlying database 500, may support multi-tenancy. Also, each of the tenants 522-528 of the database 500 may be stored within its own current database schema 520, or the database 500 may provide each of the tenants 522-528 with tenant-specific operations, with all tenants 522-528 being located within the same current database schemas 520 of the database 500. Further, the database 500 may provide catalog operations, such as DDL-based operations, for moving or copying tables, or tenants-specific portions of a table, between the current database schemas 520 and the target database schema 540.

In the description below, production tenants 528 of the current database schema 520 are distinguished from non-production tenants, such as, for example, the administration tenant 522, the template tenant 524, and the test tenant 526. In general, the non-production tenants 522-526 are associated with database functions that support the operation of the production tenants 528. Further, in one example of the method 600, the shared (e.g., tenant-independent) data 530 may be transitioned to the target database schema 540, followed by the administration tenant 522 and the template tenant 524, followed by the test tenant 526, and then the one or more production tenants 528. In other examples, the test tenant 526 may be transitioned to the target database schema 540 after the production tenants 528, but transitioning the test tenant 526 prior to the production tenants 528 facilitates testing of the production tenants 528 using the test tenant 526 to determine whether the production tenants 528 are operating properly, as mentioned above.

In the method 600, the target database schema 540 for the new or target version of the software system is created in the database 500 (operation 602). In one example, the target system version may be installed on an application server (e.g., one of the application servers 304 of FIG. 3) and configured to connect with the target database schema 540 in the database 500.

Also, any or all of data of the non-production tenants 522-526, tenant-independent data (e.g., shared data 530), as well as metadata associated with the non-production tenants 522-526 and the shared data 530, may be locked (operation 604) during the duration of the upgrade of the current software version to the target software version to prevent changes to that data during that time. In an embodiment, this metadata may describe various characteristics or aspects of the data (e.g., database tables) in the non-production tenants 522-526, such as, for example, data types, data names, data sizes, length of table fields, number of table rows, number of table columns, and the like. The non-production tenants 522-526, the shared data 530, and the metadata associated with the non-production tenants 522-526 and the shared data 530, may then be transitioned from the current database schema 520 to the target database schema 540 as non-production tenants 542-546 and shared data 550 (operation 606).

Figure 7A:
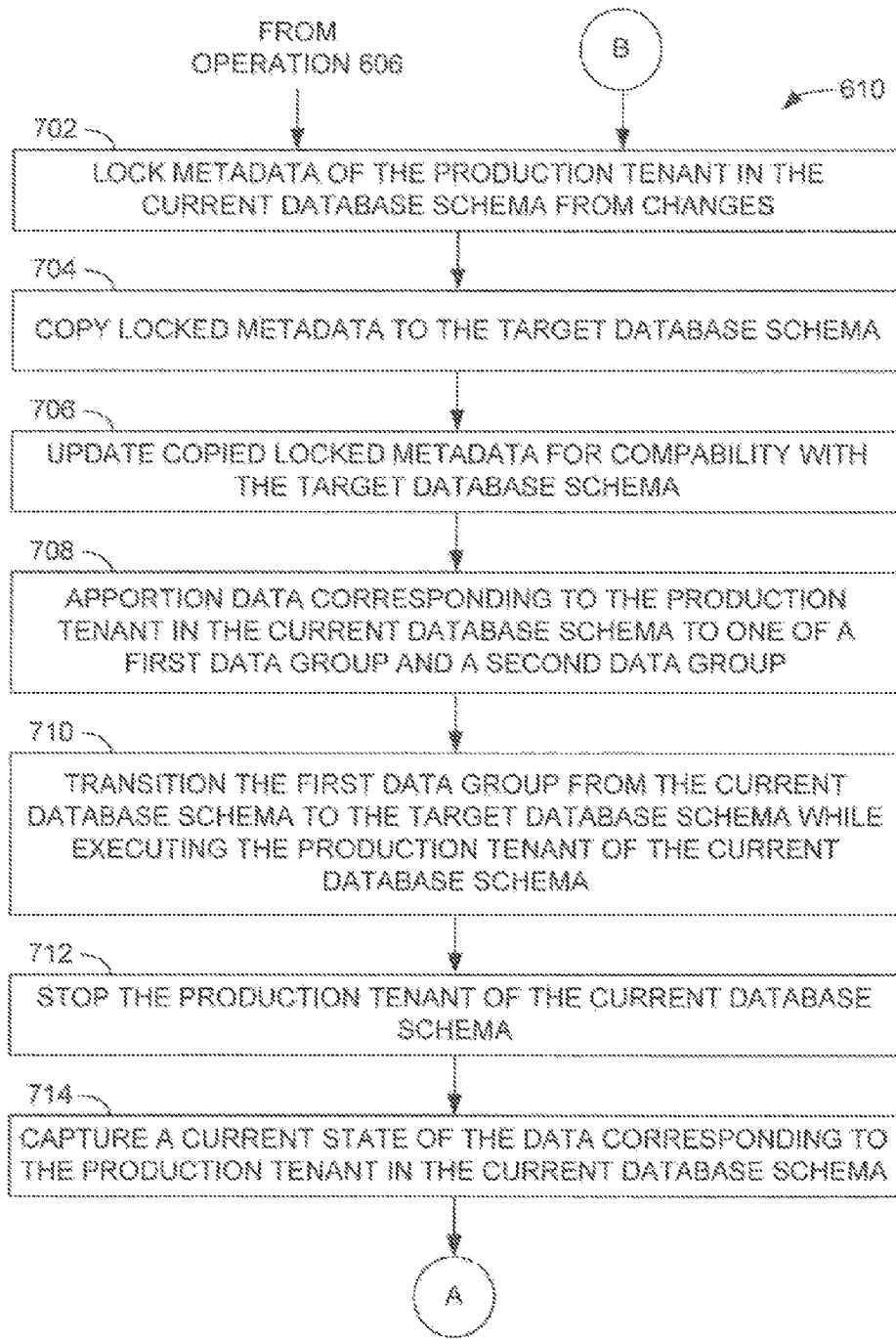
FIGS. 7A and 7B provide a flow diagram of an example method of transitioning data for a database tenant from a current database schema to a target database schema employable in the example method of FIG. 6.
Figure 7B:
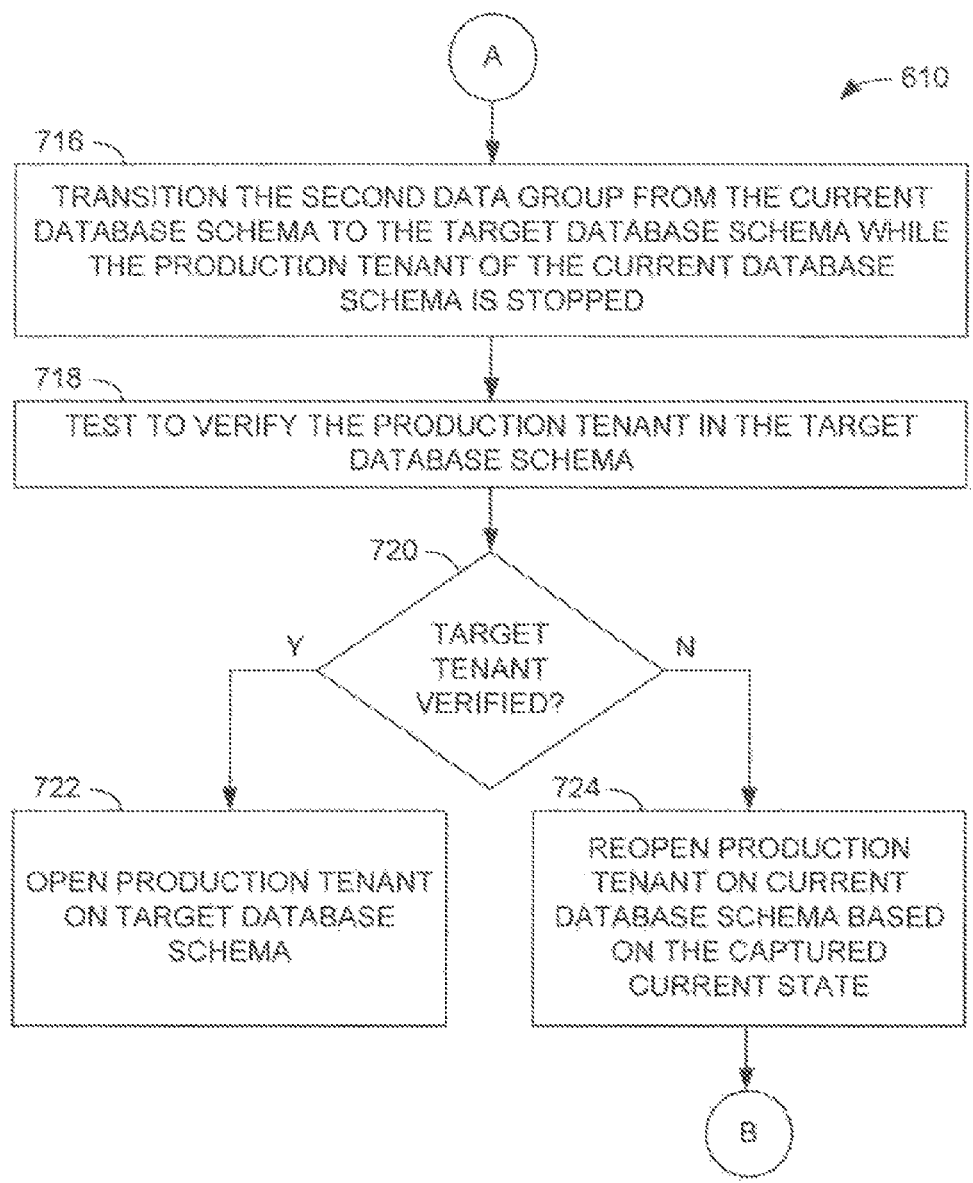

Once the non-production tenants 521-526, the shared data 530, and any metadata associated therewith have been transitioned to the target database schema 540, the production tenants 528 may be upgraded to the target database schema 540 in the database 500 (operation 608). More specifically, for each separate production tenant 528, the data and associated metadata of that production tenant 528 may be transitioned to the target database schema 540 (operation 610). Further, one or more of the production tenants 528 may be transitioned independently, thus allowing the timing and other details of the upgrading of each production tenant 528 to be chosen by the user, customer, or other entity associated with that production tenant 528. FIGS. 7A and 7B depict the transition operation for a single production tenant 528 in greater detail.

Once all of the productions tenants 528 have been upgraded from the current database schema 520 to the target database schema 540, the current database schema 520 may be deleted from the database 500 (operation 612), as the older software version will no longer be in use.

FIGS. 7A and 7B provide a flow diagram of an example method employed within operation 610 of FIG. 5 for transitioning a production tenant 528 from the current database schema 520 to the target database schema 540. In this method, the metadata of the production tenant 528 being upgraded is locked to prevent changes (operation 702). In art implementation, this locking may also include metadata associated with the production tenant 528 that is not stored specifically in the production tenant 528, but elsewhere in the current database schema 520, such as, for example, the shared data 530. The locked metadata may then be copied from the current database schema 520 to the target database schema 540 (operation 704) and updated for compatibility with the target database schema (operation 706). In one example, at least some of the locked metadata may not require copying from one area of the database 500 to another if no changes to the data are imposed by the upgrade. In some implementations, the updating of the metadata may include one or more structure and/or semantic adjustments for the compatibility with the target system version.

The data of the production tenant 528 being upgraded may then be apportioned to one of two logical data groups (operation 708). In one example, the two data groups may be referred to as an S-Block and a C-Block. In at least some implementations, the S-Block data may be data that requires less modification for upgrading to the target database schema 540 than the data of the C-block. For example, if the upgrade of the software system causes structural changes in the data of the production tenant 528, such changes may indicated that the data should be apportioned to the C-Block. Similarly, data may be apportioned to the C-Block if the upgrade of that data involves semantic changes that require execution of special migration procedures. One example of such a procedure is the use of XPRA (eXecution of Program After import) reports in ERP systems provided by SAP AG of Waldorf, Germany. Oppositely, portions of the production tenant 528 data that require little-to-no modification are likely to be regarded as S-Block data.

Figure 8:
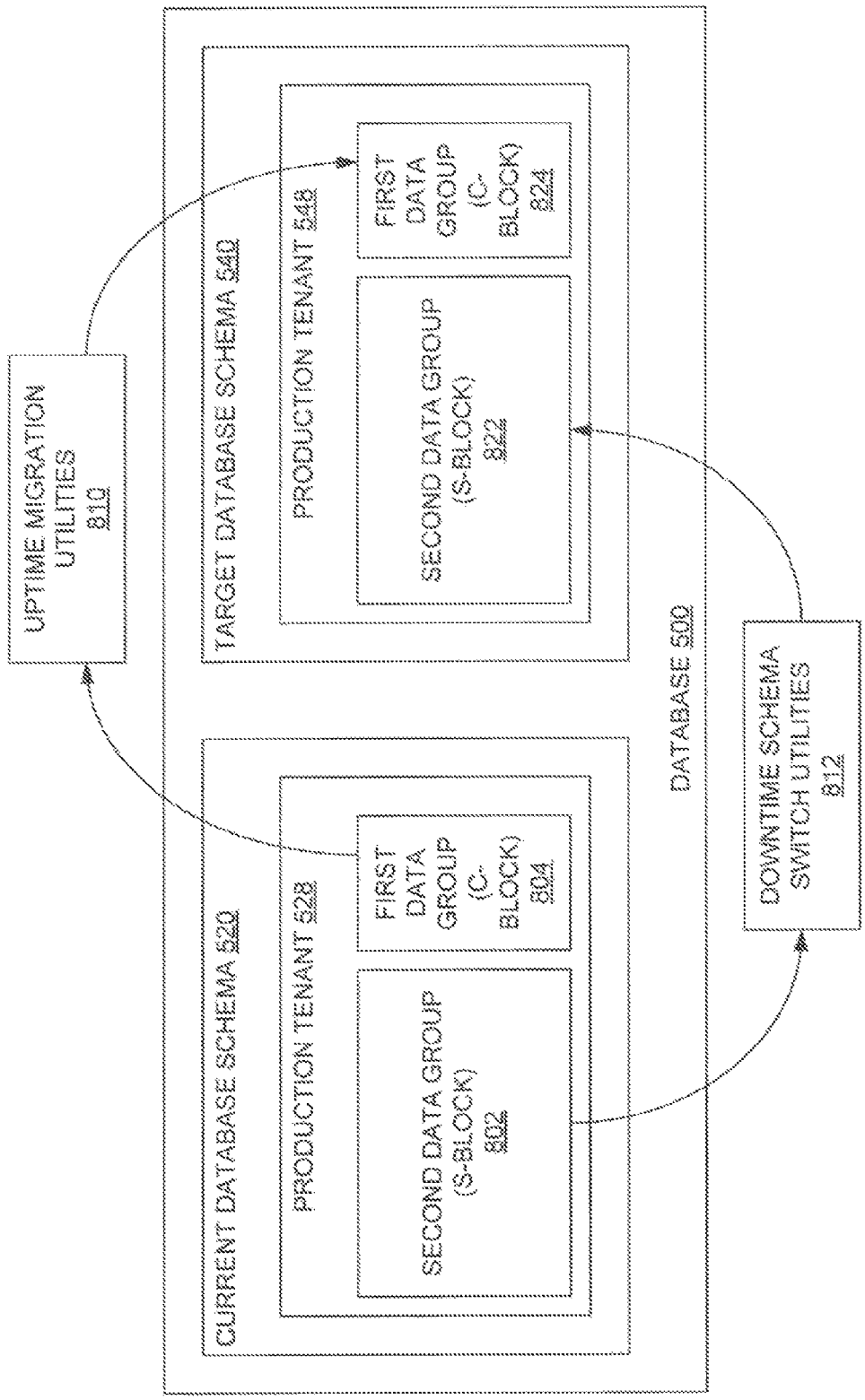
FIG. 8 is a block diagram of an example database exemplifying the transitioning of tenant data from a current database schema to a target database schema discussed in the example method of FIGS. 7A and 7B.

FIG. 8 is a block diagram of an example of the database 500 depicting a production tenant 528 having a C-Block 804 and an S-Block 802. In some examples, and as depicted in FIG. 8, the amount of S-Block 802 data may be considerable larger than the amount of C-block 804 data, as software system upgrades often cause only a small portion of the production tenant 528 data to be modified in a significant way. As described in greater detail below, the C-block 804 may be transitioned to the production tenant 548 of the target database schema 540 by way of one or more uptime migration utilities 810 while the current software system is still operating with the production tenant 529 of the current database schema 520. On the other hand, the S-Block 802 associated with the current database schema 520 may be simply copied or moved with little or no modification to an S-Block 822 for the production tenant 548 of the target database schema 540 via one or more downtime schema switch utilities 812 while the current software version is stopped.

This process of transitioning the C-Block 804 and the S-Block 802 is described in the method depicted in FIG. 7A. After the apportioning of the data of the production tenant 528 between the two data groups or blocks (operation 708), the first data group (e.g., the C-Block 804) is transitioned from the current database schema 520 to the target database schema 540 while the production tenant 528 of the current database schema 520 is operation (operation 710). This particular phase (e.g., Phase 1) of the upgrading process may be considered as a kind of "restricted uptime" phase, thus allowing the production tenant 528 to remain operational. The uptime migration utilities 810 mentioned above may perform this transitioning of the C-Block 804 by, for example, placing data involving non-critical business functionality into read-only mode, and/or by applying change record-and-replay techniques to some of all of the C-Block 804 data. An example of such a technique may involve, for example, storing a copy of at least some of the C-Block 804 data for copying, and modification to the C-Block 824 of the target database schema 540, recording some or all changes made to the C-Block 804 data in the current database schema 520 during the restricted uptime phase, and then implementing those changes in the C-Block 824 of the target database schema 540. Other techniques of copying the C-Block 804 of the current database schema 520 to the corresponding C-Block 824 of the target database schema 540 while reflecting all changes made to the current C-Block 804 in the target C-Block 824 may be utilized in other embodiments.

Once the current C-Block 804 data has been transitioned over to the target C-Block 824, the operation of the production tenant 528 in the current database schema 820 may be stopped (operation 712). A current state of the data of the production tenant 528 of the current database schema 520 may then be captured (operation 714). Continuing to FIG. 7B, the second data group (e.g., the S-Block 802) of the current database schema 520 may then be transitioned to the corresponding S-Block 822 of the target database schema 540 (operation 716), such as by way of the downtime schema switch utilities 812 of FIG. 8. As the S-Block 802 requires little or no modification as part of this transitioning, the overall transitioning of the S-Block 802 may be accomplished over a relatively short time period. In one example, the tables and other data of the S-Block 822 may be copied over from the current database schema 520 to the target database schema 540, or may be transitioned in place without any copy operation by logically designating the tables as being within the target database schema 549 instead of the current database schema 520. In some implementations, the data of the resulting S-Block 822 in the target database schema 540 may be adjusted, such as by way of database catalog operations. Typically, no significant data conversion operations are required for the S-Block 822 data of the target database schema 540, as indicated above. Also, in some examples, other transitioning or related functions corresponding to the data in the resulting production tenant 548 of the target database schema 540 may also be performed. The time during which the current software version is stopped to perform the S-Block 802 transitioning and related activities may be termed the downtime phase, or Phase 2, of the upgrading process.

Once all of the production tenant 528 data has been transitioned from the current database schema 520 to the target database schema 540, the operation of the production tenant 548 in the target database schema 540 may be tested (operation 718). In one example, testing software associated with the test tenant 546 of the target database schema 540 may be employed for such a purpose. If correct operation of the new production tenant 548 in the target database schema 540 is verified in light of the testing performed (operation 720), the production tenant 548 may be opened to users for normal business operations (operation 722). If, instead, correct operation of the new production tenant 548 is not verified (operation 720), the production tenant 528 of the current database schema 520 may be reopened for use by users based on the captured state of the production tenant 528 (operation 724) obtained earlier (e.g., during operation 714). At some later time, the transitioning of this particular production tenant 528 may then be retried, beginning at, for example, operation 702 of FIG. 7A.

In some examples, the apportioning of the data of the production tenant 528 (operation 708) as well as the functionality of the Phase 1 (e.g., operation 710) may be skipped in situations in which a short downtime (e.g., Phase 2) is less important than a short overall execution time of the transitioning of the production tenant 528 from the current database schema 520 to the target database schema 540. In other implementations, limited resources, such as a reduced amount of available storage space in the database 500, may also inform elimination of Phase 1. Such examples may include the upgrading of a test tenant (e.g., the test tenant 526), or the upgrading of a software development system operating as the software system or application associated with the database 500.

In view of at least some of the inventive concepts disclosed herein, each of the production tenants 528 of the current database schema 520 may be transitioned to the target database schema 540 independently. Thus, the timing of the transition of each production tenant 528 may be determined by a user or organization associated with that tenant 528. In other examples, two or more of the production tenants 528 may be upgraded together. Further, a decision as to whether the resulting production tenant 548 of the target database schema 540 is then ready to be opened to users, or whether the previous production tenant 528 of the current database schema 520 is to be reinstated due to unacceptable results of the upgrading process, can also be made on a tenant-by-tenant basis. Also, the separate handling of test tenants 546, as described above, may facilitate a more manageable verification of the target software version prior to the subsequent upgrade or transition of the production tenants 528. Further, by performing the upgrade within a single database 500, at least a portion of one or more production tenants 528 may be transitioned from the current database schema 520 to the target database schema 540 without copying or moving the data therein, resulting in a faster, more reliable upgrade process. In some examples, this capability is especially useful for platform upgrades involving core software that does not affect the business components of the overall software system.

While some of the embodiments described herein involve software system upgrades of ERP systems, the techniques and concepts discussed herein are applicable to other computing systems executing upgradeable software systems or applications that maintain or access a database hosting data for multiple tenants.

Figure 9:
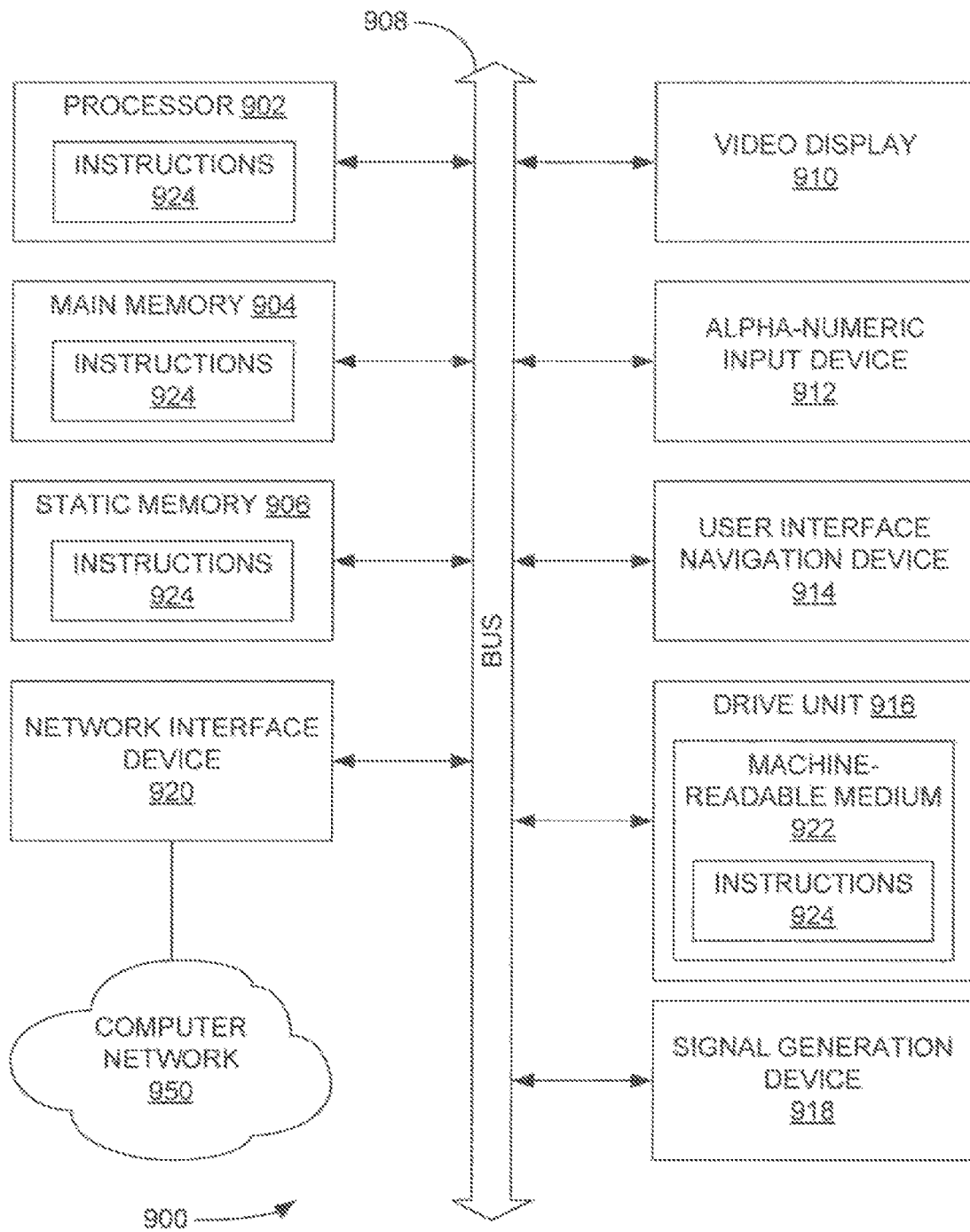
FIG. 9 is a block diagram of a machine in the example form of a processing system within which may be executed a set of instructions for causing the machine to perform any one or more of the methodologies discussed herein.

FIG. 9 depicts a block diagram of a machine in the example form of processing system 900 within which may be executed a set of instructions 924 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 900 includes a processor 902 (e.g., a central processing unit (CPU), a graphics processing unit (GPU), or both), a main memory 904 (e.g., random access memory), and static memory 906 (e.g., static random-access memory), which communicate with each other via bus 908. The processing system 900 may further include video display unit 910 (e.g., a plasma display, a liquid crystal display (LCD), or a cathode ray tube (CRT)). The processing system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is sorted one or more sets of data structures and instructions 924 (e.g., software) embodying or utilized by any one or more of the methodologies or functions described herein. The data structures and instructions 924 may also reside, completely or at least partially, within the main memory 904, the static memory 906, and/or within the processor 902 during execution thereof by processing system 900, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 900) or one or more hardware modules of a computer system (e.g., a processor 902 or a group of processors) may be configured by software (e.g., an application or application portions) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be drive by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose 902 that is configured using software, the general-purpose processor 902 may be configured as respectively different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implements modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine but deployed across a number of machines. In some example embodiments, the processors 902 may be located in a single location (e.g., within a home environment, within an office environment, or as a server farm), while in other embodiments, the processors 902 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component may be implemented as separate components. These and other variations, modifications, additions, and improvements fall within the scope of the claims and their equivalents.

What is claimed is:

1. A method, comprising:
   creating, in a database, a target database schema for a target version of a software system; and
   upgrading a plurality of tenants in a current database schema of a current version of the software system to the target database schema, the upgrading comprising, for each tenant:
   capturing a current state of data corresponding to the tenant in the current database schema;
   transitioning, using at least one processor of a machine, the data corresponding to the tenant from the current database schema to the target database schema, the transitioning comprising transitioning a first data group of the data corresponding to the tenant in the current database schema to the target database schema while executing the tenant of the current database schema, and transitioning a second data group of the data corresponding to the tenant in the current database schema from the current database schema to the target database schema while the tenant of the current database schema is stopped;
   testing to verify the tenant in the target database schema;
   opening the tenant in the target database schema for users in response to the tenant in the target database schema being verified; and
   restoring the tenant in the current database schema using the captured state in response to the tenant in the target database schema not being verified.

2. The method of claim 1, further comprising:
   for each tenant in the current database schema, retrying the capturing of the current state, the transitioning of the data, and the testing of the tenant after the restoring of the tenant in the current database schema.

3. The method of claim 1, further comprising:
   deleting the current database schema from the database in response to the plurality of tenants in the target database schema being verified.

4. The method of claim 1, the transitioning of the data corresponding to the tenant further comprising:
   assigning data corresponding to the tenant in the target database schema based on the data corresponding to the tenant in the current database schema; and
   adjusting at least a portion the data corresponding to the tenant in the target database schema for use in the target database schema.

5. The method of claim 1, further comprising:
   locking tenant-independent data of the current database schema from changes; and
   creating tenant-independent data for the target database schema based on the tenant-independent data of the current database schema after locking the tenant-independent data of the current database schema;
   the locking of the tenant-independent data of the current database schema and the creating of the tenant-independent data for the target database schema occurring prior to the upgrading of any of the plurality of tenants of the current database schema.

6. The method of claim 1, the transitioning of the data corresponding to the tenant from the current database schema to the target database schema further comprising:
   locking metadata of the tenant in the current database schema from changes;
   copying the locked metadata to the target database schema; and
   updating the copied metadata according to the target database schema.

7. The method of claim 1, the transitioning of the data corresponding to the tenant from the current database schema to the target database schema further comprising:
   apportioning the data corresponding to the tenant in the current database schema to one of the first data group and the second data group prior to the transitioning of the first data group from the current database schema to the target database schema.

8. The method of claim 7, the apportioning of the data being based on an amount of processing to transition the data from the current database schema to the target database schema, the first data group requiring more processing to transition than the second data group.

9. The method of claim 7, the apportioning of the data being based on an amount of data conversion to transition the data from the current database schema to the target database schema, the first data group requiring more data conversion than the second data group.

10. The method of claim 1, the transitioning of the first data group comprising:
    copying the first data group in the current database schema to the target database schema;
    updating the first data group in the target database schema based on the target database schema;
    recording changes made to the first data group in the current database schema after the copying of the first data group to the target database schema; and
    revising the first data group in the target database schema based on the recorded changes.

11. The method of claim 1, the
    transitioning of the data corresponding to the tenant from the current database schema to the target database schema further comprising:
        stopping execution of the tenant of the current database schema after the transitioning of the first data group from the current database schema to the target database schema;
        the capturing of the current state of the data corresponding to the tenant in the current database schema occurring after the stopping of the execution of the tenant of the current database schema and before the transitioning of the second data group from the current database schema to the target database schema.

12. The method of claim 1, the transitioning of the second data group comprising:
    adjusting the second data group in the target database schema according to the target database schema.

13. The method of claim 1, the upgrading of at least two of the plurality of tenants in the current database schema occurring at different times.

14. A non-transitory computer-readable storage medium including instructions that, when executed by at least one processor of a machine, cause the machine to perform operations comprising:
    creating, in a database, a target database schema for a target version of a software system; and
    upgrading, to the target database schema, a plurality of tenants in a current database schema of a current version of the software system, the upgrading comprising, for each tenant:
        capturing a current state of data corresponding to the tenant in the current database schema;
        transitioning the data corresponding to the tenant from the current database schema to the target database schema, the transitioning comprising transitioning a first portion of the data while the tenant in the current database schema is operating and transitioning a second portion of the data while the tenant in the current database schema is stopped;
        testing to verify the tenant in the target database schema;
        opening the tenant in the target database schema for users in response to the tenant in the target database schema being verified; and
        restoring the tenant in the current database schema using the captured state in response to the tenant in the target database schema not being verified.

15. The non-transitory computer-readable storage medium of claim 14, the current database schema comprising a separate current database schema for each of the plurality of tenants, the target database schema comprising a separate target database schema for each of the plurality of tenants.

16. The non-transitory computer-readable storage medium of claim 14, the current database schema comprising a single current database schema for all of the plurality of tenants, the target database schema comprising a single target database schema for all of the plurality of tenants, the transitioning of the data employing tenant-specific operations for each of the plurality of tenants.

17. A system, comprising:
    a database;
    at least one processor; and
    a database management module comprising instructions that, when executed by the at least one processor, cause the at least one processor to perform operations comprising:
        creating, in the database, a target database schema for a target version of a software system; and
        upgrading, to the target database schema, a plurality of tenants in a current database schema of a current version of the software system, the upgrading comprising, for each tenant:
            capturing a current state of data corresponding to the tenant in the current database schema;
            transitioning, using at least one processor of a machine, the data corresponding to the tenant from the current database schema to the target database schema, the transitioning comprising transitioning a first data group of the data corresponding to the tenant in the current database schema to the target database schema while executing the tenant of the current database schema, and transitioning a second data group of the data corresponding to the tenant in the current database schema from the current database schema to the target database schema while the tenant of the current database schema is stopped;
            testing to verify the tenant in the target database schema;
            opening the tenant in the target database schema for users in response to the tenant in the target database schema being verified; and
            restoring the tenant in the current database schema using the captured state in response to the tenant in the target database schema not being verified.

18. The system of claim 17, the operations further comprising:
    for each tenant in the current database schema, retrying the capturing of the current state, the transitioning of the data, and the testing of the tenant after restoring the tenant in the current database schema.

19. The system of claim 17, the transitioning of the data corresponding to the tenant from the current database schema to the target database schema further comprising:
    apportioning the data corresponding to the tenant in the current database schema to one of the first data group and the second data group prior to the transitioning of the first data group from the current database schema to the target database schema.

20. The system of claim 17, the transitioning of the data corresponding to the tenant from the current database schema to the target database schema further comprising:
    stopping execution of the tenant of the current database schema after the transitioning of the first data group from the current database schema to the target database schema;
    the capturing of the current state of the data corresponding to the tenant in the current database schema occurring after the stopping of the execution of the tenant of the current database schema and before the transitioning of the second data group from the current database schema to the target database schema.

* * * * *